D. G. DAVIES.
ELECTRIC INDICATOR AND SIGNAL.
APPLICATION FILED NOV. 16, 1908.
934,713.
Patented Sept. 21, 1909.
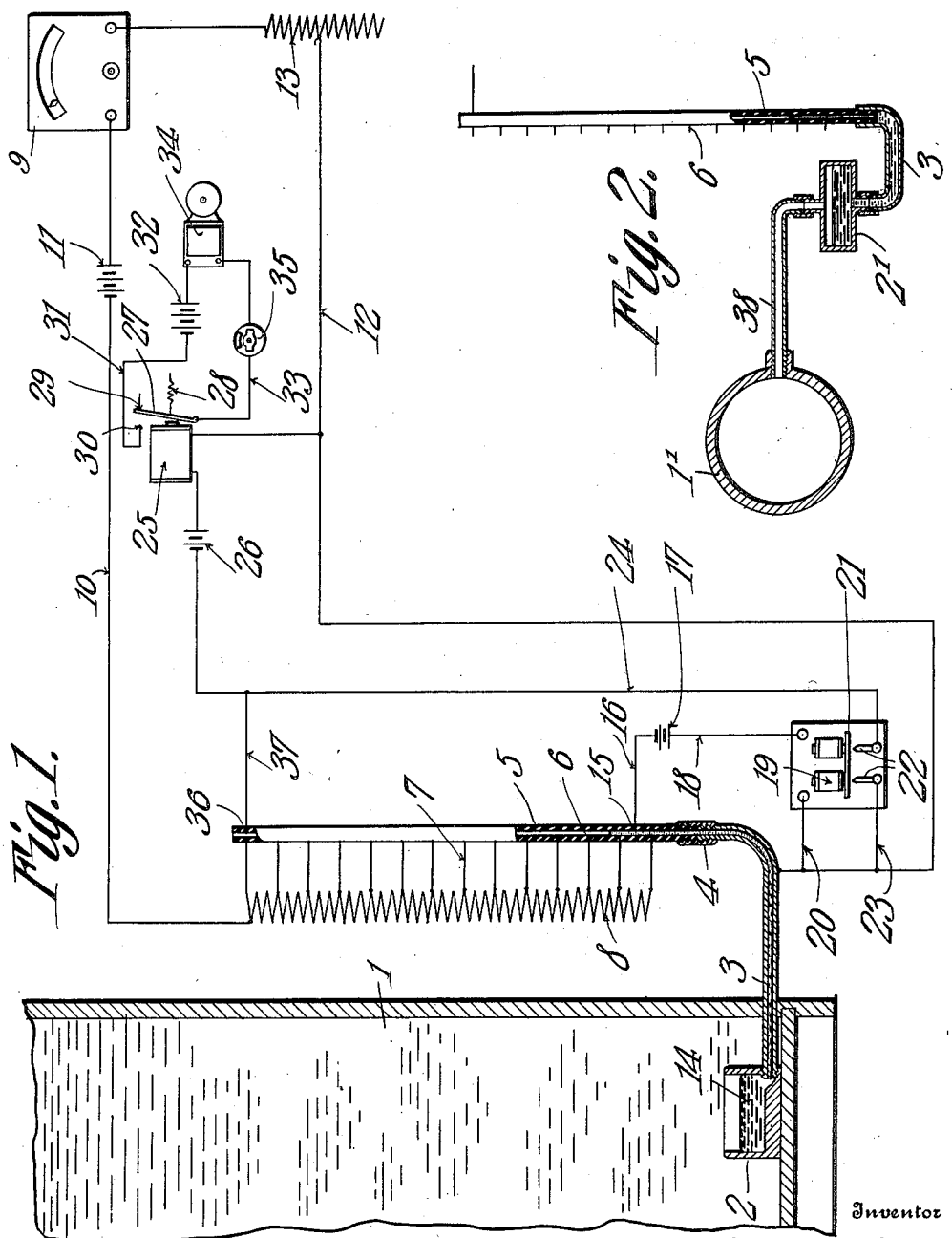
Witnesses
E. H. Stewart
F. T. Chapman
Inventor
David G. Davies.
By C. A. Snow & Co.
Attorneys

UNITED STATES PATENT OFFICE.

DAVID G. DAVIES, OF COEUR D'ALENE, IDAHO.

ELECTRIC INDICATOR AND SIGNAL.

934,713.            Specification of Letters Patent.      Patented Sept. 21, 1909.

Application filed November 16, 1908. Serial No. 462,846.

*To all whom it may concern:*

Be it known that I, DAVID G. DAVIES, a citizen of the United States, residing at Coeur d'Alene, in the county of Kootenai and State of Idaho, have invented a new and useful Electric Indicator and Signal, of which the following is a specification.

This invention has reference to improvements in electric indicators and signals and is designed more particularly for the indication of fluid level by a suitable visual indicator located at a distance from the reservoir or receptacle for the fluid and also for the sounding of an audible signal for one or both extremes of fluid level.

In accordance with the present invention there is located in or in operative relation to the reservoir for the liquid, the level of which is to be indicated at a distance, a suitable receptacle containing a fluid susceptible to the differences in pressure of the liquid within the reservoir as the pressure of the liquid varies in accordance with the depth of said liquid. The liquid controlled by the differences in level of the liquid in the reservoir is caused to close electric circuits in such order as to cause the indication at a distant indicating instrument of such character as to reveal to an observer the fluid level from time to time in the reservoir.

The invention is designed more particularly for the indication of water level in a water reservoir and especially the indication at a pumping station of the water level in a distant reservoir into which the water from the pumping station is delivered.

Various indicating means have been devised from time to time for such a purpose but all such means depend upon the operation of more or less complicated mechanisms which are liable to get out of order and are also subject to other defects which mitigate against their usefulness.

In accordance with the present invention the physical properties of mercury are utilized both as to its high specific gravity and its mobility under normal temperatures and even under low temperatures. Furthermore, advantage is taken of the electric conductivity of mercury. To this end there is provided in accordance with the present invention a receptacle for mercury at or below the lowest level it is designed to indicate in the reservoir and this reservoir of mercury is put in communication with a stand pipe for mercury, which stand pipe is made of or at least its interior is of insulating material and at stated intervals this stand pipe is pierced by electric conductors connected in multiple arc through suitable resistances and all included in an electric circuit leading to a distant indicator. The mercury column rises and falls in accordance with the rise and fall of the water in the reservoir and this mercury column causes the closure of the indicator circuit in such manner as to produce an actuation of the indicator commensurate with the changing level in the reservoir. In this connection alarm circuits are provided for high and low water levels also operated by the changing level of the mercury column.

The invention will be best understood from a consideration of the following description taken in connection with the accompanying drawings forming a part of this specification, in which drawings—

Figure 1 is a partly structural diagram illustrating the invention, and Fig. 2 is a view showing the application of the invention to a water main.

Referring to the drawing there is shown a reservoir 1 which may be a tank of suitable proportions or a masonry reservoir of as large proportions as desired, the showing in the drawing being typical only. Within the reservoir on the bottom thereof or at a point as low as or lower than the lowest water level it is desired to indicate there is located a vessel or receptacle 2, which in the particular instance under consideration may be considered as an open iron vessel, although other materials unaffected by mercury and which either are or may be so protected as to be unaffected by water. This vessel 2 is in communication at its lower part with a pipe or conduit 3, which may also be of iron because of its resistance to the action of mercury, and also because it is electro-conducting. Outside the reservoir the pipe 3 is directed upwardly and by means of a suitable coupling 4 is joined to an upright pipe 5 which in the particular structure under consideration may be made of hard vulcanized rubber because of its resistance to the action of mercury and also because of its electric insulating properties. This however does not preclude the use of other materials of like properties or the use of metal pipe with an insulating lining, the principal condition being that the pipe should have its inner walls at least resistant to the action of mercury and also of insulating properties.

At suitable distances apart the walls of the pipe 5 are pierced by studs 6 of conducting material, which studs, if the pipe 5 be of insulating material need not be otherwise insulated. Since the specific gravity of mercury is 13.6 the distances between the studs 6 will be to the differences in water level to be indicated as 1 to 13.6. If the water level indications are to be in steps of a foot each then the studs 6 will be separated by .88— inches. If any other unit of water level indication be chosen then the spaces between the studs 6 will be fixed accordingly.

From each stud 6 there leads a conductor 7 and these conductors are all connected at the end remote from the studs by suitable resistances 8, the resistances in the particular structure under consideration all being alike, but these resistances may be varied in accordance with the indicating instrument chosen or if it be desired to indicate different degrees of water level at different heights as when the steps between the indicated levels be varied unequally or progressively instead of evenly as in the case under consideration.

At the distant point of indication say at the pumping station or at any other desired point there is located an indicator 9 which may be calibrated to respond to electric currents of strengths corresponding to the differences in water level it is desired to indicate. On one side the indicator 9 is connected by an electric conductor 10 to the final conductor 7 of the series connected to the studs 6 and this conductor 10 may include a battery 11 or other suitable source of electric energy. On the other side the indicator 9 is connected by a conductor 12 to the iron pipe 3, or the conductor 12 may be replaced by suitable ground connections between the indicator 9 and the ground on one hand and the pipe 3 and the ground on the other hand. For this reason the conductor 12 may be designated as the return or ground conductor whether the circuit be an all metal circuit or a grounded circuit in the ordinary use of the term. The conductor 12 or the grounded circuit replacing the same may include an adjustable resistance 13 so as to balance the circuit for variations in the battery or other electric source 11 and to adjust the indicator 9 to different lengths of circuits between the reservoir and the indicator without the necessity of calibrating each indicator 9 for each separate installation.

Assume that the reservoir 1 is empty and that water is being pumped thereinto. As the water rises above the surface of the mercury 14 within the vessel 2 the column of mercury within the pipe 5 will begin to rise proportionately to the increased pressure of the water on the mercury in the vessel 2 due to the rise of water level. Ultimately the mercury column within the tube 5 reaches the lowermost stud 6 and there is now established a circuit from the current source 11 through the conductor 10 and through all the resistances 8 to the conductor 7 leading to the lowermost stud 6, thence by the mercury column to the pipe 3 and by the conductor 12 or ground and through the adjustable resistance 13 to the indicator 9 and back to the current source 11. This current will cause a movement of the indicating hand of the indicator 9 over the dial of the indicator to an extent agreeable to the lowermost indicated water level. As the water in the reservoir continues to rise the second stud 6 is coupled up in the circuit by the rising mercury column and the resistance between the second conductor 7 and the lowermost conductor 7 is bridged or short circuited so that a greater current will now flow to the indicator and the hand will be moved a commensurate distance. So with the rising water level, the column of mercury will follow and one after another of the studs 6 will be reached and the resistances 8 will be bridged or short circuited until finally they are all cut out when the highest water level to be indicated has been reached, the hand on the indicator moving progressively forward as the water level has risen. There is thus produced an indication of the water level due to the increasing water pressure as the depth of the water is increased. When the water level falls then the reverse operation takes place and the resistances 8 are progressively cut into the circuit so as to be active therein and the battery current is correspondingly cut down and the indicator hand returns toward its initial position thus indicating the water level within the limit determined upon and by the predetermined steps whether the water be rising or falling.

The indicator 9 will give visual indication of the water level at any time desired, but it is advisable that an audible signal be given when the water level has reached a predetermined minimum or has attained a predetermined maximum and the operator at the pumping station will thereby be notified to either start the pumping to replenish the water supply or to stop the pump to prevent an over-flow of the reservoir. For this purpose there is provided in the pipe 5 another stud 15 and this stud is connected by conductor 16 to a battery or other current source 17 which latter is through a conductor 18 connected to electro-magnets 19 and these latter are coupled by a conductor 20 to the pipe 4 either directly or through the common conductor 12.

The stud 15 is located between the lowermost stud 6 and the next stud or plug 6 so that on the rising mercury column having passed the lowermost desired level it will then quickly reach the stud or plug 15 thus establishing a circuit from the battery 17 through the conductor 16 and plug 15 thence to the mercury column and pipe 3 to the conductor 12 and by way of the conductor 20 through the magnets 19 and back to the battery 17 through the conductor 18. This will cause the energization of the magnets 19 and within the field of these magnets is an armature 21 which is attracted as soon as the magnet becomes energized. This armature is a bridging conductor or carries such a bridging conductor for two circuit terminals 22 spaced apart and insulated from one another and one of these terminals is connected by a conductor 23 to the common conductor 12 while the other terminal is connected by a conductor 24 to a relay magnet 25 and this conductor 24 may include a battery 26 or other source of electric energy. When the bridging conductor 21 rests upon the terminals 22 then the circuit charged by the battery 26 is closed and the relay magnet 25 is energized but when the magnets 19 are energized the armature or bridging conductor 21 is moved away from the terminals 22 and the circuit including the battery 26 and relay magnet 25 is broken and the said magnet is thus deënergized.

So long as the water level is above the predetermined minimum sufficiently to bring the mercury column into contact with the plug or stud 15 the relay magnet 25 remains inactive, but should the water level fall toward the predetermined minimum until the plug or stud 15 is no longer reached by the mercury column then the magnet 19 is deënergized and the bridging conductor or armature 21 falls or is moved into contact with the terminals 22 and the circuit fed by the battery 26 is closed and the magnet 25 is then energized. The magnet 25 controls an armature lever 27 against the action of a retracting spring 28 which latter tends to hold the lever against an inert back stop 29. In the path of the lever 27 in its direction of movement under the influence of the magnet 25 is a circuit terminal 30 connected by a conductor 31 to a battery or other current source 32 and leading from the battery 32 back to the lever 27 is another conductor 33 in which conductor is included a bell 34 or other audible electrically operated signal means and a snap switch 35 which may be provided with the usual off and on indications. When the magnet 25 is energized and the armature lever 27 is pulled against the action of the spring 28 until in engagement with the terminal 30 then there is established a circuit from the battery 32 to the terminal 30 and armature lever 29 by the conductor 33 through the switch 35, the latter being assumed to be closed, thence to the bell 34 and back to the battery 32. Under these conditions the bell will ring and continue to ring so long as the circuit is intact. In order to avoid a continuous ringing of the bell 34 after the pumping machinery has been set into operation and also before the water level has been raised sufficiently to bring the mercury column into contact with the stud or plug 15, the switch 35 may be turned to the off position thus preventing a further ringing of the bell. As soon as the water level has risen sufficiently to cut out the magnet 25 then the switch 35 should be again returned to the on position so that the device is in condition to again give a signal should the water level once more drop to the minimum point.

Because of the infrequent service the batteries 26 and 32 may be of small size and if desired of the open circuit type such as the ordinary dry batteries of commerce. The batteries 11 and 17 being in almost constant service may be of the long life closed circuit type known as the gravity battery, or any other suitable source of current for the purpose may be employed.

When the mercury column has risen until the uppermost stud or plug 6 is reached because of the rise of water level to the maximum point then the mercury column also reaches another plug or stud 36 connected by a branch conductor 37 to the conductor 24 before referred to. Now there is established a circuit from the battery 26 through the conductor 24 and branch conductor 37 to the stud or plug 36 thence by the mercury column to the conductor 12 and back to the battery 26 through the relay magnet 25. This will cause the attraction of the armature 27 and the closure of the local circuit including the alarm 34 thus giving to the operator an alarm and on the inspection of the indicator 9 it will be ascertained that this alarm is a high water alarm.

It will be understood, of course, that the mercury vessel or container may be exterior to the reservoir instead of inside the same or may be connected to a conduit leading from the reservoir or source of supply since the device operates by pressure, and in practice it is often times necessary to tap a main leading from the reservoir rather than to install the mercury vessel in the reservoir.

In Fig. 2 the invention is shown as applied to a main, although the arrangement would be the same were the invention applied directly to a reservoir with the mercury vessel exterior thereto.

The main 1' is tapped by a pipe 38 leading into a closed mercury vessel or container 2' through the top thereof and the pipe 3 leads from the bottom of the vessel 2' in the form shown in Fig. 2. The pressure within the main or reservoir is communicated to the mercury in the vessel 2' and causes a commensurate rise in the column of mercury in the pipe 5, the operation being the same as in the form shown in Fig. 1.

In the operation of the invention the variations in level of the mercury in the vessel or container may be negligible and therefore the variations of the mercury column in the pipe 5 will be, for all practical purposes, in direct proportion to variations in the weight or pressure of a fluid per unit area at a predetermined point, due to variation in the height of its surface above such predetermined point.

What is claimed is:—

1. The combination with a reservoir for liquids, of an open vessel for mercury therein, an electric conducting pipe leading from the mercury vessel to the exterior of the reservoir, an upright pipe leading from the electrically conducting pipe exterior to the reservoir, and formed of non-conducting material, contacts carried by the non-conducting pipe, a series of resistances connected to the contacts in order, a charged electric circuit connected at the ends to the conducting pipe and to one end of the series of resistances respectively, an indicator in said circuit responsive to current variations, a local charged alarm circuit, a relay controlling the said local alarm circuit, a charged circuit including the relay, and connected at one end to a contact at the upper end of the insulating pipe, and at the other end electrically connected to the conducting pipe, another circuit bridged across the charged relay circuit, and another charged relay circuit controlling the bridging circuit and connected to the conducting pipe and to a lower contact in the insulating pipe.

2. A means for indicating fluid levels, comprising a single mercury column and a container therefor, said column being responsive to differences in weight of different levels of a column of the fluid, a charged electric circuit, means under the control of the mercury column for varying the resistance of the circuit in accordance with the differences of fluid level and included in said charged circuit, an indicator also in said charged circuit and responsive to the variations of current produced by variations in resistance, a normally closed and separately charged electric circuit opened by the mercury column on approaching the minimum level, another separately charged circuit and means controlled by the first normally closed circuit for holding the said last-named separately charged circuit normally open, an alarm circuit controlled by the normally open circuit, and means for closing the normally open circuit around the break therein by the mercury column when the latter reaches the maximum level.

In testimony that I claim the foregoing as my own, I have hereto affixed my signature in the presence of two witnesses.

DAVID G. DAVIES.

Witnesses:
GEO. HARDING,
T. C. HAHN.